C. LOSEE.
APPARATUS FOR DRYING TOBACCO.

No. 191,450. Patented May 29, 1877.

Witnesses:

Inventor:

UNITED STATES PATENT OFFICE.

CYRUS LOSEE, OF BROOKLYN, NEW YORK.

IMPROVEMENT IN APPARATUS FOR DRYING TOBACCO.

Specification forming part of Letters Patent No. 191,450, dated May 29, 1877; application filed April 14, 1877.

*To all whom it may concern:*

Be it known that I, CYRUS LOSEE, of the city of Brooklyn, county of Kings, and State of New York, have invented a new and Improved Apparatus for Drying Tobacco and other Articles, which invention is fully set forth in the following specification, reference being had to the accompanying drawing, in which—

Figure 1:
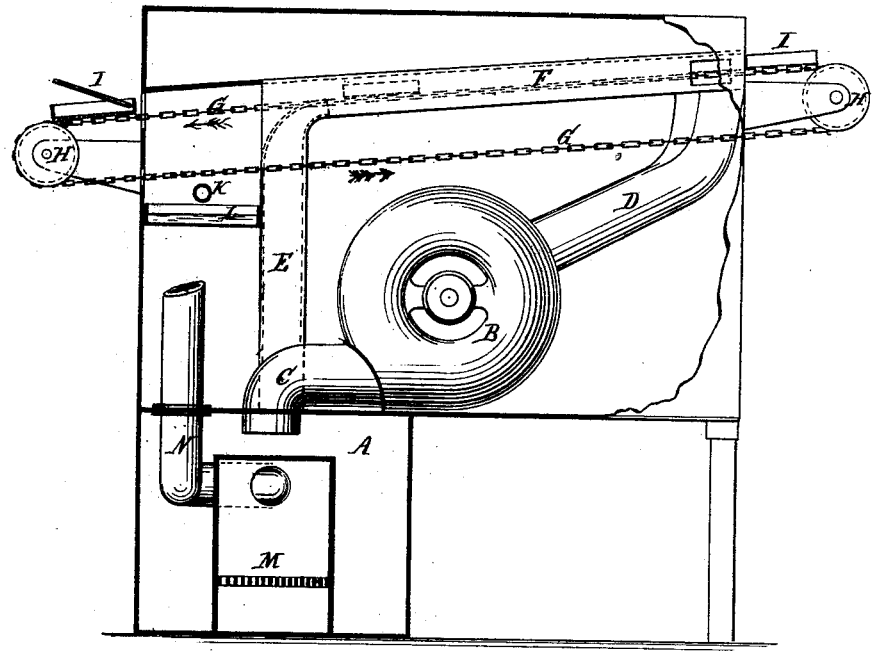
Figure 2:
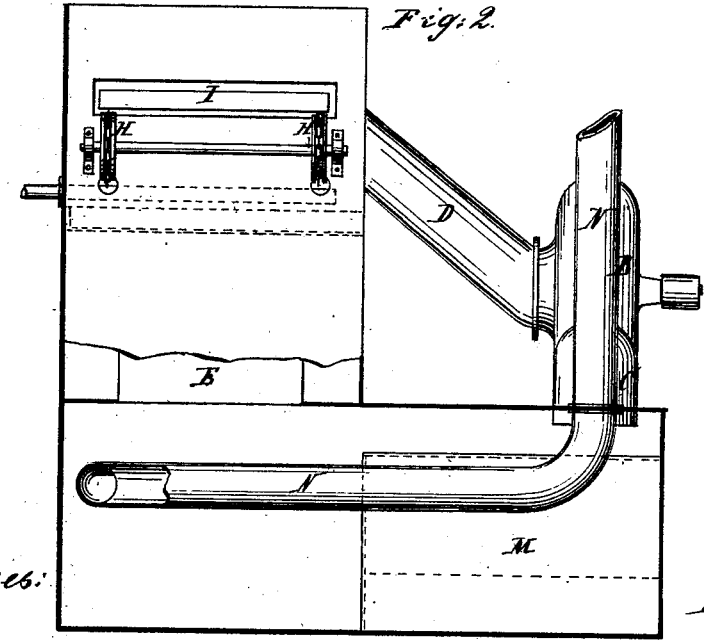

Figure 1 represents a sectional side view. Fig. 2 is a sectional end view.

Similar letters indicate corresponding parts.

This invention consists in the combination of an air-heating chamber, a drying-chamber, a flue which leads from the air-heating chamber into the drying-chamber, an endless apron or chain, which serves to carry the material to be dried through the drying-chamber, and a fan-blower, which draws the air from the drying-chamber and forces it into the heating-chamber, so that the air which rises from the material to be dried is immediately carried out of the drying-chamber and passed through the heating-chamber, whence it is carried back into the drying-chamber, and thereby the operation of drying tobacco or other materials can be carried on with great economy in time, labor, and fuel.

Under the discharge end of the drying-chamber is situated an open pan filled with water, and a steam-pipe which extends over said pan, and is perforated with a number of small holes, so that the steam issuing from these holes strikes the liquid in the pan, and, after having become saturated with moisture, rises up and serves to soften the dried tobacco-leaves, so that the same are not liable to break in being handled.

In the drawing, the letter A designates the heating-chamber, which communicates with the drying-chamber F by a flue, E. In the heating-chamber is situated a furnace, M, the smoke-flue N of which is bent in serpentine form before it passes out of said chamber, so that the air contained in this chamber is rapidly heated to the desired temperature. Any other heating apparatus may, however, be substituted for the furnace, such as a coil heated by steam or hot air.

On the top of the heating-chamber is situated a fan-blower, B, which draws the air through a pipe, D, from the drying-chamber F, and which forces this air through a pipe, C, into the heating-chamber.

Through the drying-chamber extend two endless chains, G, which run over pulleys H, and on which are placed trays I, containing the tobacco or other material to be dried. These chains move in the direction of the arrow marked near them in Fig. 1, so that the trays move in a direction opposite to the current of air in the drying-chamber.

Under the discharge end of the drying-chamber is situated an open pan, L, over which extends a steam-pipe, K, which is perforated with a number of small holes in its under side, so that the steam discharging from these holes strikes the liquid in the pan L, and, after having become saturated with moisture, rises up in contact with the trays I, passing out of the drying-chamber. This arrangement is of value in drying tobacco, since, by the action of the moist steam, the dried tobacco-leaves are softened, so that they do not break in being handled after they have been dried.

By means of the fan-blower the air which rises through the flue E is caused to move in a direction opposite to that of the trays I, and the same air is returned to the heating-chamber, so that very little additional heat is required to raise the temperature thereof to the desired point, and thereby the operation of drying tobacco or other materials can be effected in an economical manner.

What I claim as new, and desire to secure by Letters Patent, is—

1. The combination of an air-heating chamber, a drying-chamber, a flue which leads from the air-heating chamber into the drying-chamber, an endless chain or apron, which serves to carry the material to be dried through the drying-chamber, and a fan-blower, which draws the air from the drying-chamber and forces it into the heating-chamber, all constructed and operating substantially as shown and described.

2. The combination, with the air-heating chamber A, the drying-chamber F, the flue E, the endless apron or chains G, and the fan-blower B, of an open pan, L, and steam-jet pipe K, substantially as and for the purpose set forth.

CYRUS LOSEE.

Witnesses:
THOS. H. MESSENGER,
W. M. HUCKEL.